United States Patent
Kia et al.

(10) Patent No.: US 7,910,038 B2
(45) Date of Patent: Mar. 22, 2011

(54) PREFORMS AND METHODS OF MAKING THE SAME

(75) Inventors: Hamid G. Kia, Bloomfield Hills, MI (US); Ingrid A. Rousseau, Clinton Township, MI (US); Elisabeth J. Berger, Farmington Hills, MI (US); John N. Owens, Franklin, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/276,983

(22) Filed: Nov. 24, 2008

(65) Prior Publication Data

US 2010/0127427 A1    May 27, 2010

(51) Int. Cl.
*B28B 7/32* (2006.01)
*B28B 21/44* (2006.01)
*B28B 21/50* (2006.01)

(52) U.S. Cl. ........ 264/313; 264/219; 264/314; 264/511; 264/517

(58) Field of Classification Search .................. 264/511, 264/219, 517, 313, 314
See application file for complete search history.

(56) References Cited

U.S. PATENT DOCUMENTS

| | | | | |
|---|---|---|---|---|
| 2,999,272 A | * | 9/1961 | Warnken | 425/389 |
| 4,110,396 A | * | 8/1978 | Reynolds | 264/236 |
| 5,041,260 A | * | 8/1991 | Johnson et al. | 264/510 |
| 5,158,733 A | * | 10/1992 | Trimble | 264/258 |
| 5,328,494 A | * | 7/1994 | Kelman et al. | 65/60.1 |
| 6,986,855 B1 | * | 1/2006 | Hood et al. | 264/219 |
| 7,422,714 B1 | | 9/2008 | Hood et al. | |

FOREIGN PATENT DOCUMENTS

WO    WO 93/20994    10/1993

* cited by examiner

*Primary Examiner* — Richard Crispino
*Assistant Examiner* — Robert Dye
(74) *Attorney, Agent, or Firm* — Dierker & Associates, P.C.

(57) ABSTRACT

A method for making a preform includes creating a pressure differential between an inside and an outside of a perforated shape memory polymer mandrel in its temporary shape. The pressure differential is such that pressure outside the perforated shape memory polymer mandrel is greater than pressure inside the perforated shape memory polymer mandrel. The perforated shape memory polymer mandrel has i) a predetermined preform shape as the temporary shape and ii) a shrunken shape as its permanent shape, wherein the shrunken shape is configured such that it is removable from the predetermined preform shape. The method further includes depositing, as the pressure differential is maintained, at least one material onto a surface of the perforated shape memory polymer mandrel. The at least one material is set in the predetermined preform shape, thereby forming the preform.

10 Claims, 6 Drawing Sheets

CURE ($T_C < T_{SWM}$)

HEAT ($T > T_{SWM}$)

REMOVE MANDREL FROM PREFORM 12, 12"
16

A
16
12, 12"    18

HEAT (T > T$_{SWM}$) AND PRESSURE 12, 12'
16
+P
16
18
12, 12'

COOL (T < T$_{SWM}$) AND
REMOVE FROM EXTERNAL MOLD

-P
12, 12'
16
-P

| REMOVE BLADDER BEFORE CREATING, DEPOSITING AND CURING TO FORM PREFORM | MAINTAIN BLADDER IN MANDREL BEFORE CREATING, DEPOSITING AND CURING TO FORM PREFORM |
|---|---|

FIG. 2E    FIG. 2F

HEAT ($T > T_{SWM}$) AND PRESSURE

COOL ($T_{SWB} < T < T_{SWM}$)

COOL ($T < T_{SWB}$) AND REMOVE FROM EXTERNAL MOLD

| REMOVE BLADDER BEFORE CREATING, DEPOSITING AND CURING TO FORM PREFORM | MAINTAIN BLADDER IN MANDREL BEFORE CREATING, DEPOSITING AND CURING TO FORM PREFORM |
|---|---|
| FIG. 4E | FIG. 4F |

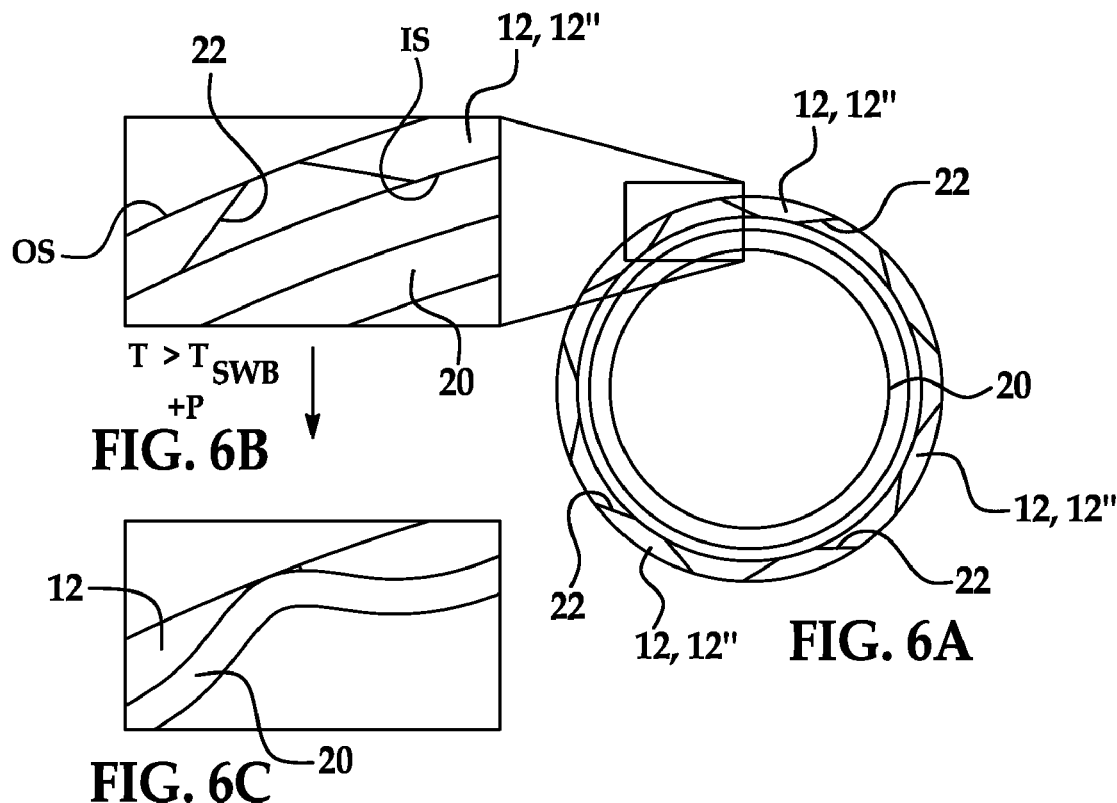
FIG. 6B
FIG. 6C
FIG. 6A
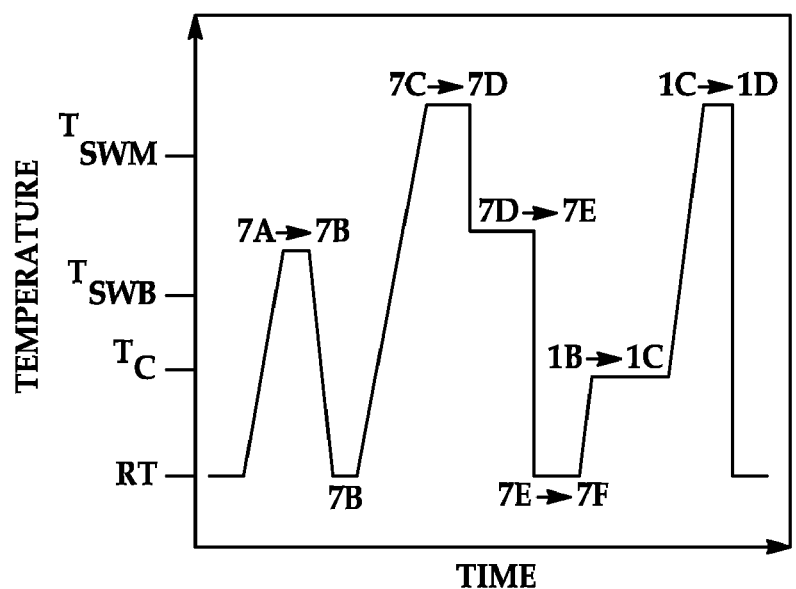
FIG. 8

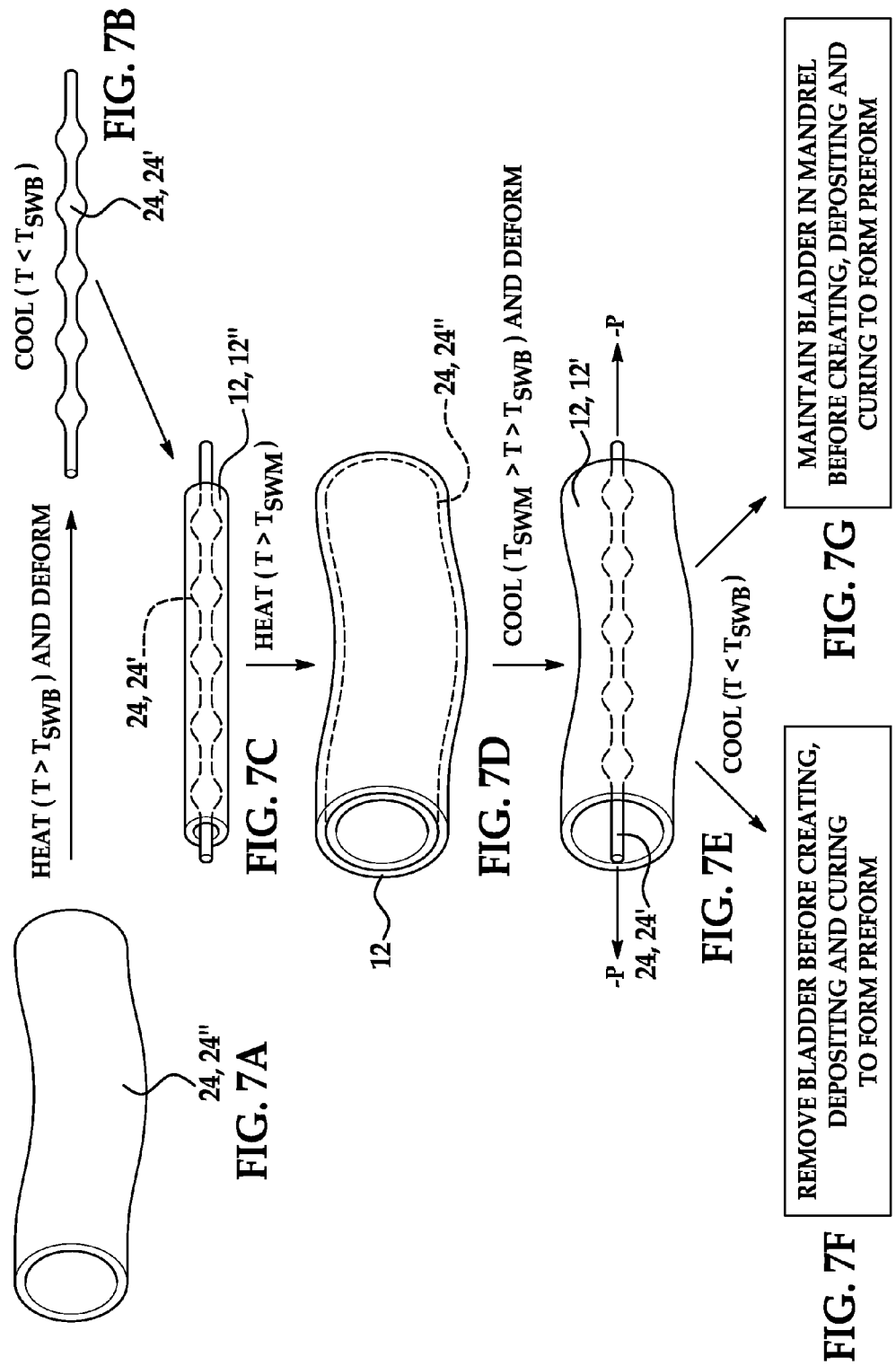

US 7,910,038 B2

PREFORMS AND METHODS OF MAKING THE SAME

TECHNICAL FIELD

The present disclosure relates generally to preforms and methods of making the same.

BACKGROUND

There are many techniques for molding that involve the use of preforms. One example of such a technique is structural reaction injection molding (SRIM). However, preforms with complex or intricate shapes may be difficult and/or time consuming to manufacture. As such, costs and energy consumption of such manufacturing processes may be undesirably high. For an enclosed or tubular preform, for example, some techniques involve generating multiple pieces of the preform separately, and then stapling or otherwise adhering the preform pieces together for subsequent processing. In another example, preforming utilizes an articulated screen, which may also undesirably add to the cost of preforming. Furthermore, there may be some geometries, such as an S-shaped or otherwise curved tube with a non-constant cross-section, which are not amenable to being formed via these methods.

SUMMARY

Various methods for forming preforms are disclosed herein. One example of the method includes creating a pressure differential between an inside and an outside of a perforated shape memory polymer mandrel in its temporary shape. The pressure differential is such that pressure outside the perforated shape memory polymer mandrel is greater than pressure inside the perforated shape memory polymer mandrel. The perforated shape memory polymer mandrel has i) a predetermined preform shape as the temporary shape and ii) a shrunken shape as its permanent shape, wherein the shrunken shape is configured such that it is removable from the predetermined preform shape. The method further includes depositing, as the pressure differential is maintained, at least one material onto a surface of the perforated shape memory polymer mandrel. The at least one material is set in the predetermined preform shape, thereby forming the preform.

BRIEF DESCRIPTION OF THE DRAWINGS

Features and advantages of embodiments of the present disclosure will become apparent by reference to the following detailed description and drawings, in which like reference numerals correspond to the same or similar, though perhaps not identical, components. For the sake of brevity, reference numerals having a previously described function may or may not be described in connection with subsequent drawings in which they appear.

FIGS. 2A through 2F schematically depict an example of a method for setting a perforated shape memory polymer mandrel using a flexible bladder;

FIGS. 4A through 4F schematically depict an example of a method for setting a perforated shape memory polymer mandrel using a non-perforated shape memory polymer bladder;

FIG. 6A is a cross-sectional view of the perforated shape memory polymer mandrel and the shape memory polymer bladder of FIG. 4A;

FIGS. 6B and 6C are enlarged views of a portion of the perforated shape memory polymer mandrel and the shape memory polymer bladder of FIG. 6A before the bladder is deformed (FIG. 6B) and after the bladder is deformed (FIG. 6C);

FIGS. 7A through 7G schematically depict another example of a method for setting a perforated shape memory polymer mandrel using a non-perforated shape memory polymer bladder; and FIG. 8 is a graph depicting the temperature relationships between some of the steps of the method shown in FIGS. 7A through 7F and FIGS. 1A through 1D.

DETAILED DESCRIPTION

Figure 1A:
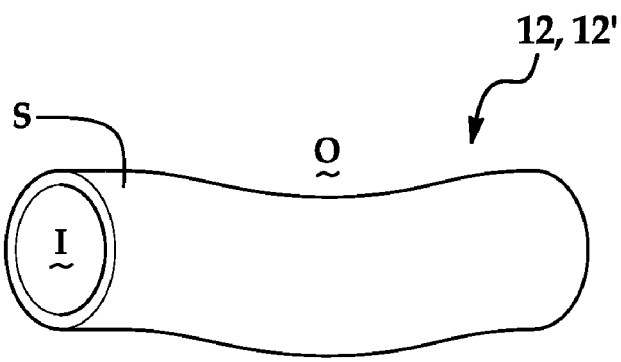
FIGS. 1A through 1D schematically depict an example of a method for making a preform using a perforated shape memory polymer mandrel.

Examples of the method disclosed herein utilize at least a perforated shape memory polymer mandrel. The perforated shape memory polymer mandrel is switchable between a predetermined preform or part shape and a collapsed shape that is readily removable from the part shape. This enables complex shapes to be formed without resulting in die lock of the preform.

As used herein, the phrase "predetermined preform shape" refers to the desirable shape of the ultimately formed preform. Generally, the predetermined preform shape is any desirable simple or complex geometric shape that is configured such that a mandrel used in forming the preform is removable from such shape. In the non-limiting examples shown in the FIGS., the predetermined preform shape is a tube having one or more curves and/or a non-constant cross-section. It is to be further understood that bladders and/or mandrels used in forming the preform, and described as having the predetermined preform shape, may be smaller in size than the actual preform. In one example, a mandrel used to form the preform would have the same shape as the resulting preform; however the mandrel outer diameter would be equivalent to the outer diameter of the preform minus the thickness the preform. In another example, a shape memory bladder inside of a mandrel used to form the preform would, in one of its two states, have the same shape as the resulting preform; however the shape memory bladder outer diameter, in the state having the predetermined preform shape, would be equivalent to the outer diameter of the preform minus the thickness of both the preform and the mandrel.

Furthermore, it is to be understood that the mandrels disclosed herein are perforated mandrels. Such perforations are not shown in FIGS. 1A-1D, 2A-2D, 4A-4D and 7A-7D merely for clarity purposes. FIGS. 6A-6C do illustrate one example of the perforations. Beyond the illustrations in FIGS. 6A-6C, it is to be understood that the mandrel perforations may have any desirable geometry that aids in maintaining fibers on the mandrel when a pressure differential is applied thereto.

Still further, when discussing heating and cooling of the shape memory polymer mandrels and bladders herein, it is to be understood that the temperature and time of exposure to such temperature depend, at least in part, on the shape memory polymer selected. Such polymers are thermally or otherwise activated shape memory polymers which may be returned from a deformed or temporary state to their original or permanent state via an external stimulus (e.g., direct heat or indirect heat using an electric field, a magnetic field, irradiation, a change in relative humidity, a change in salvation state, etc). Non-limiting examples of such shape memory polymers include epoxy-, acrylate-, styrene-, or olefin-based systems that may include fillers (e.g., inorganic fillers) or other active materials. It is to be understood that fillers may be reinforcing fillers, which improve the mechanical properties of the shape memory polymer.

Referring now to FIGS. 1A through 1D, one example of the method for forming the preform 10 (see FIG. 1D) is depicted. FIG. 1A depicts an example of a perforated shape memory polymer mandrel 12 in its temporary shape 12'. In all of the examples disclosed herein, the temporary shape 12' of the mandrel 12 is a predetermined preform shape, and the permanent shape 12" (shown in FIG. 1D) of the mandrel 12 is a shrunken or collapsed shape. It is to be understood that the shrunken/collapsed permanent shape 12" of the mandrel 12 is removable from the predetermined preform shape.

The mandrel 12 may be formed of any desirable shape memory polymer, such as those previously listed.

In this example, when the mandrel 12 is in its temporary shape 12' (which, as previously mentioned, corresponds to the predetermined preform shape), it is exposed to a pressure differential. This pressure differential is indicated by the "PD" in FIG. 1B. The pressure differential PD is created between an area inside I and an area outside O of the mandrel 12, 12' such that the pressure inside the mandrel 12, 12' is lower than the pressure outside of the mandrel 12, 12'. In one example, the pressure differential PD is created by drawing a vacuum from inside I of the mandrel 12, 12', and in another example, the pressure differential PD is created by flowing a fluid (other than air) from outside O of the mandrel 12, 12' through to the inside I of the mandrel 12, 12'. It is to be understood that the pressure differential PD required will depend, at least in part, on the stiffness of the mandrel 12 (which depends upon modulus, thickness, number of perforations, etc.), and the properties (e.g., weight, density, fiber length, etc.) of the material 14 being deposited.

Figure 1B:
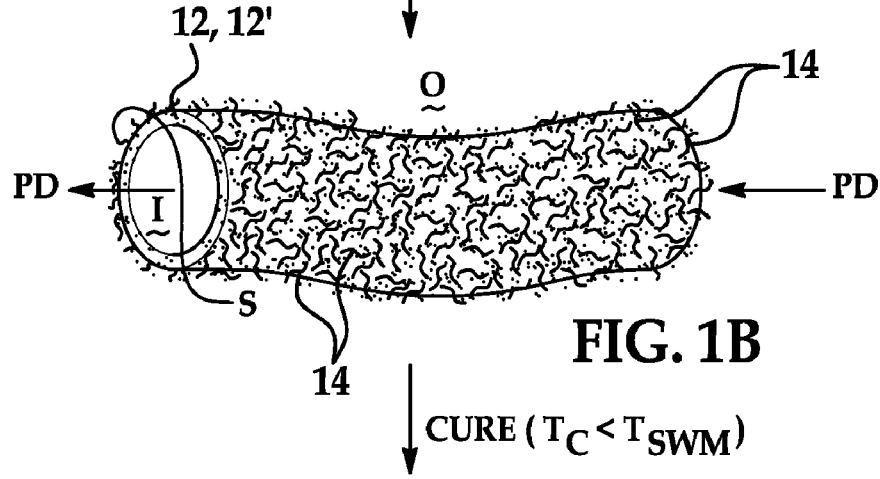

As shown in FIG. 1B, while the pressure differential PD is maintained, at least one material 14, which is desirable to form the preform 10, is deposited on the mandrel 12, 12'. Suitable deposition techniques include spraying techniques or slurry techniques. Other preforming techniques which do not require a pressure differential PD but may benefit from it may also be used; examples of which techniques include but are not limited to lay-up techniques (e.g., manual or automatic), wet lay-up techniques, winding techniques, and/or the like. Examples of suitable material(s) 14 include fibers (e.g., glass fibers or carbon fibers), other reinforcing materials (e.g., clay platelets or nanotubes) or non-reinforcing materials, binder materials (e.g., epoxy powders, polyester emulsions, thermoplastic or cellulosic fibers, or the like), and/or any other desirable materials for forming the preform 10, and/or any other materials utilized in the deposition process. For example, if a slurry deposition is used, one or more carrier solutions may be utilized in addition to the fibers and binder (or other materials 14, such as those listed hereinabove). It is to be understood that the carrier solution for the slurry deposition may also be the fluid used to create the pressure differential PD. In one example, the slurry process depends on the liquid being re-circulated through the perforations in the mandrel 12 from the outside O to the inside I using, for example, liquid pumps. This fluid flow creates the pressure differential PD. In such instances, the liquid also contains fibers dispersed therein, which are deposited on the mandrel 12 as the liquid continues to flow through the perforations. In another example, the slurry process is accomplished by lifting the mandrel 12 through a slurry of fibers and liquid in a manner sufficient to deposit the fibers on the surface S of the mandrel 12 as the liquid drains through the perforations. The carrier solution may be water, or some other desirable liquid. The carrier solution may also include other processing aids (e.g., anticoagulants or coupling agents (e.g., silanes)) to improve the form and fiber/matrix adhesion of the resulting composite.

It is to be understood that the pressure differential PD is sufficient to maintain the material(s) 14 on the outer surface S during deposition until such material(s) 14 is/are consolidated, for example, via curing or some other suitable method. The air and/or fluid flowing through the perforations contribute(s) to maintaining the material(s) 14 on the surface S of the mandrel 12.

Figure 1C:
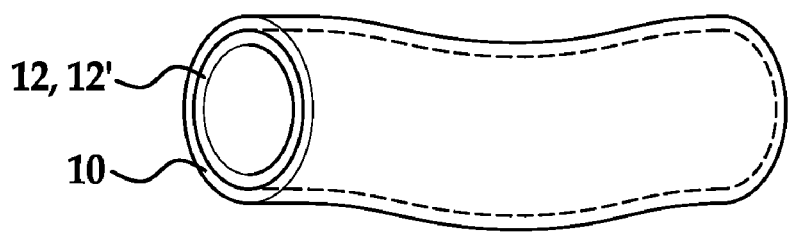

As depicted between FIG. 1B and FIG. 1C, the material 14 is then set so that it forms the preform shape over the mandrel 12, 12'. Setting may be accomplished via curing or some other suitable method that bonds the material(s) 14 together. When curing is a suitable setting method, it may be accomplished via exposure to heat, ultraviolet radiation, or some other suitable means. If heat is used to cure, it is to be understood that the curing temperature $T_C$ is less than the switching temperature $T_{SWM}$ of the mandrel 12. Such a curing temperature $T_C$ ensures that the mandrel 12 is not converted to its permanent shape 12" before the preform 10 is set and formed. FIG. 1C depicts the cured material(s) 14 (i.e., the preform 10) on the mandrel 12, 12'.

Figure 1D:
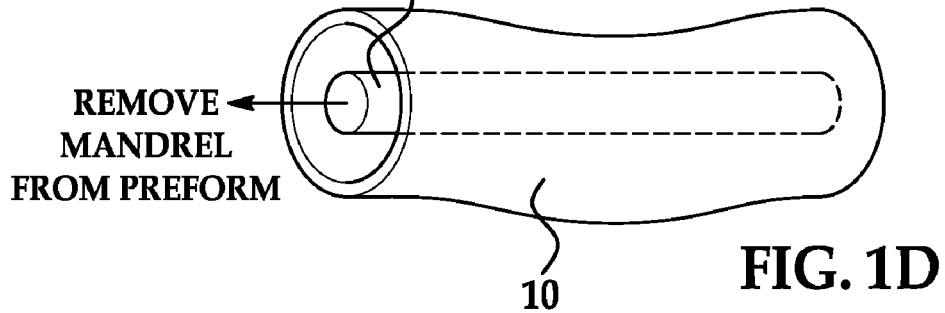
Figure 3:
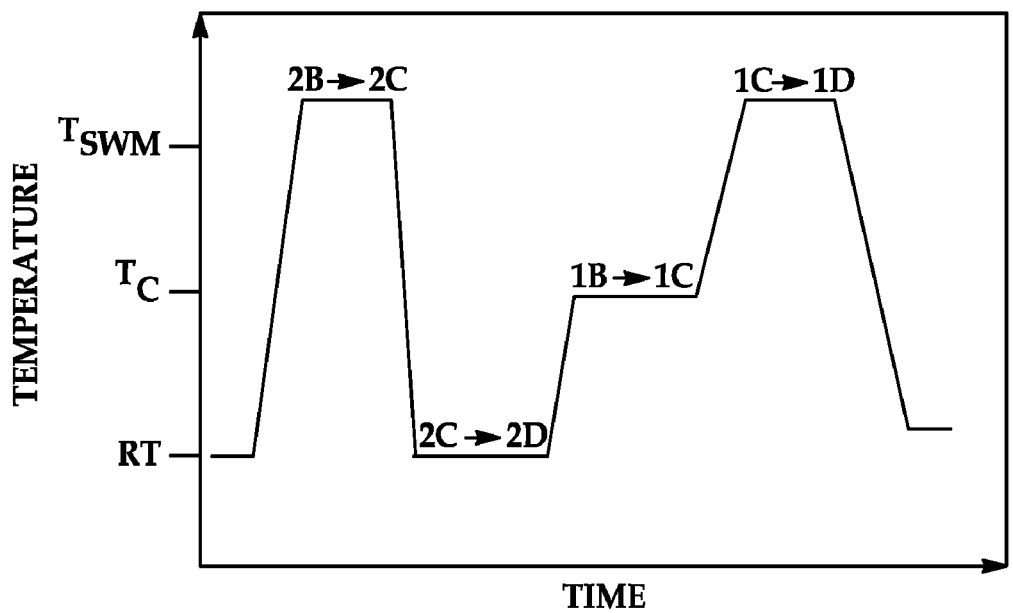
FIG. 3 is a graph depicting the temperature relationships between some of the steps of the method shown in FIGS. 2A through 2F and 1A through 1D.
Figure 5:
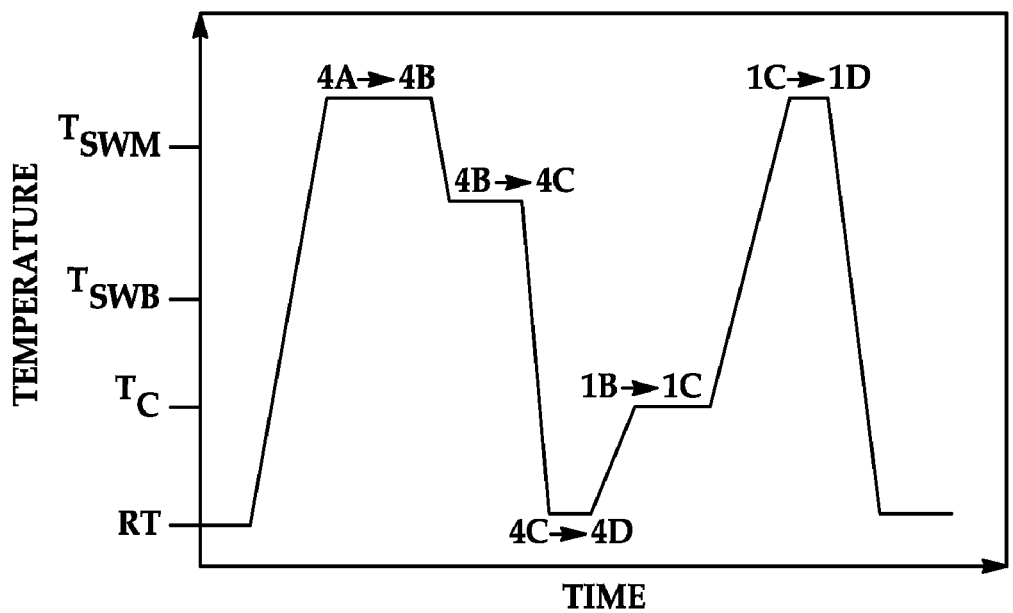
FIG. 5 is a graph depicting the temperature relationships between some of the steps of the method shown in FIGS. 4A through 4F and 1A through 1D.

The mandrel 12 is then activated above its switching temperature $T_{SWM}$ (which depends on the shape memory polymer used). This activation causes the mandrel 12 to collapse, and thus revert to its permanent shape 12", as shown in FIG. 1D. The mandrel 12, 12" may then be removed from the preform 10. Graphs depicting the change in temperature between curing and reverting the mandrel 12 to its permanent shape 12" are shown in FIGS. 3, 5 and 8.

In some instances, the removed mandrel 12, 12" may have its temporary shape 12' reset, or may be reshaped to set a new temporary shape using a forming die (not shown) and a suitable heating and cooling sequence.

It is to be understood that prior to forming the preform 10 via the method discussed above in reference to FIGS. 1A through 1D, the mandrel 12 may undergo additional processing, thereby rendering it suitable for use in the preforming process. FIGS. 2A through 2D, 4A through 4D, and 7A through 7D illustrate non-limiting examples of such mandrel 12 shaping/setting processes.

Referring now to FIGS. 2A through 2D, one example of shaping or setting the mandrel 12 is depicted. In this example, the mandrel 12 has a flexible bladder 16 therein. FIG. 3 is a graph depicting a non-limiting example of how the temperature fluctuates during the method of FIGS. 2A through 2D, and then during curing (as shown between FIGS. 1B and 1C) and reverting the mandrel 12 to its permanent shape 12" (as shown between FIGS. 1C and 1D).

Figure 2A:
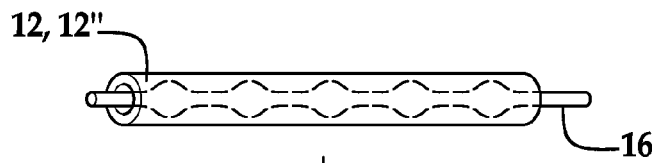

As shown in FIG. 2A, the mandrel 12 is in its permanent shrunken shape 12" when the flexible bladder 16 is inserted therein. The flexible bladder 16 is generally non-porous and compliant. Non-limiting examples of suitable materials for the flexible bladder 16 include rubber, polychloroprene, nylon, polyisobutylene, or other like materials.

Figure 2B:
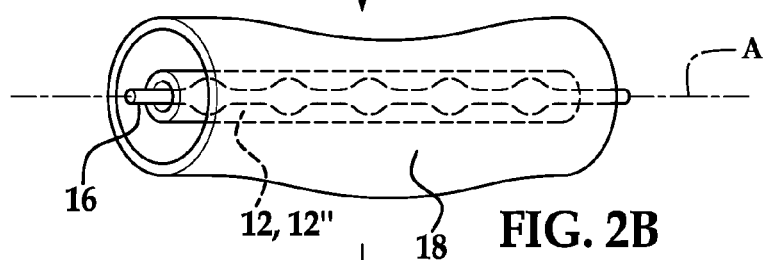

The mandrel 12, 12" having the flexible bladder 16 therein is then inserted into an external mold 18 having the predetermined preform shape. In this example, the external mold 18 has the same inner diameter dimension(s) as the inner dimensions of the preform shape. This ensures that the mandrel 12 in its temporary shape 12' has an outer surface that is equal to the desirable inner surface of the preform 10. FIG. 2B illustrates the mandrel 12, 12" and flexible bladder 16 inserted into the external mold 18.

Furthermore, a parting section for the external mold may be along a center axis A of the bladder 16/mandrel 12 assembly. This particular external mold 18 configuration enables facile removal of the mandrel 12 and flexible bladder 16 after the temporary shape 12' of the mandrel 12 is set. It is to be understood that the external mold 18 may be configured in another suitable manner such that the mandrel 12, 12' is readily removable.

Figure 2C:
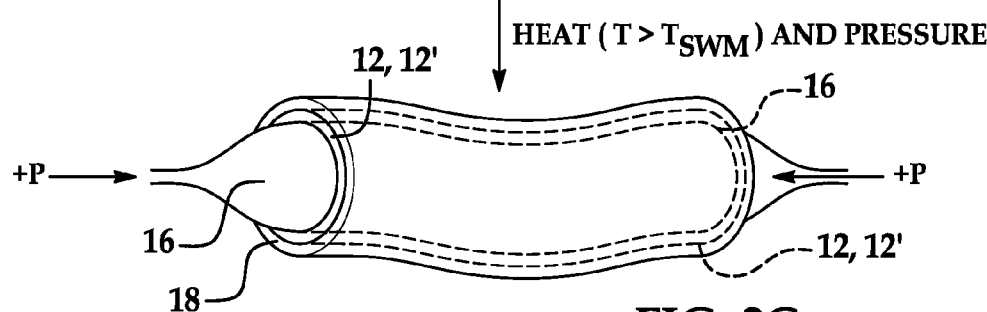

The mandrel 12 and flexible bladder 16 are then heated to a temperature that is above the switching temperature $T_{SWM}$ (shown in FIG. 3) of the mandrel 12. This causes the mandrel 12 to become easily deformable. Pressure (+P) is applied to the inside of the flexible bladder 16 (as shown in FIG. 2C), thereby causing the flexible bladder 16 to expand and push against the deformable mandrel 12, which in turn causes the mandrel 12 to conform to its surroundings, i.e., the inner surface of the external mold 18. Such pressure may be applied by exerting air or gas pressure inside the bladder 16, or, in some instances, by fluid pressure. When fluid pressure is used, it may be desirable to cycle hot and cold fluids.

As the mandrel 12 is pressed against the external mold 18, the temperature is then dropped to below the switching temperature $T_{SWM}$ (see FIG. 3) of the mandrel 12. In some instance, it may be particularly desirable to drop the temperature to below the curing temperature $T_C$. The pressure is maintained during this cooling process. Cooling the mandrel 12 in this manner sets the temporary shape 12' to the external mold 18 shape, and thus the desirable preform shape.

Figure 2D:
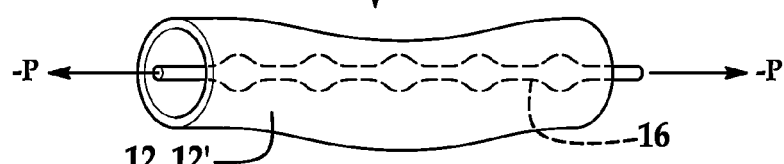

The mandrel 12 in its set temporary shape 12' may then be removed from the external mold 18, as shown in FIG. 2D. As previously mentioned, the external mold 18 may be configured to open in a desirable manner to enable removal of the mandrel 12, 12' therefrom.

FIG. 2D also depicts the depressurization (−P) of the flexible bladder 16 within the mandrel 12, 12'. The previously applied pressure is removed, and the flexible bladder 16 collapses within the mandrel 12, 12'. It is to be understood that since the temporary shape 12' of the mandrel 12 has been set, the removal of pressure at the lower temperature does not affect the set temporary shape 12' of the mandrel 12.

FIGS. 2E and 2F illustrate two different examples of the method after the flexible bladder 16 is collapsed. As shown in FIG. 2E, the flexible bladder 16 may be removed from the mandrel 12, 12' prior to using the mandrel 12, 12' to form the preform 10 (e.g., via the method(s) discussed hereinabove in reference to FIGS. 1A through 1D). In another example, shown in FIG. 2F, the flexible bladder 16 may remain in the mandrel 12, 12' during the formation of the preform 10 (e.g., via the method(s) discussed hereinabove in reference to FIGS. 1A through 1D). While not shown in the Figures, it is to be understood that when the flexible bladder 16 is maintained in the mandrel 12 during the formation of the preform 10, creating the pressure differential PD (of FIG. 1B) further includes drawing a vacuum on the flexible bladder 16 such that the perforations in the mandrel 12 remain unobstructed. In other words, the pressure differential PD created during preform 10 formation is accomplished such that the perforations are not blocked by the flexible bladder 16. By drawing a vacuum simultaneously from within the mandrel 12 and the bladder 16, the same pressure may be maintained both inside and outside of the bladder 16. It is to be understood that this process may be mechanically assisted, which keeps the bladder 16 in tension along the axis A (see FIG. 2B) and away from the perforations while pulling a vacuum from inside it. Such mechanical assistance may be in the form of a rod (or other similar object) positioned through the center of the bladder 16. It is believed that as long as the pressure is the same inside and outside the bladder 16, the bladder 16 will not undesirably deform.

As previously mentioned, FIG. 3 depicts increases and decreases in temperature over the process of setting the mandrel 12 per the method of FIGS. 2A through 2D and then over the process of forming the preform 10 per the method of FIGS. 1A through 1D. As shown in the graph, the curing temperature $T_C$ of the binder (or other material 14) used to form the preform 10 is less than the switching temperature $T_{SWM}$ of the mandrel 12. As previously mentioned, the mandrel 12 does not deform at this curing temperature $T_C$. After curing, the temperature may again be increased above the switching temperature $T_{SWM}$ of the mandrel 12, if it is desirable to recover the permanent shape 12" of the mandrel 12 and remove it from the preform 10. In this graph and the graphs shown in FIGS. 5 and 8, it is to be understood that the actual temperatures may depend on the shape memory polymer(s) and resins used. It is to be further understood that when cooling below the curing temperature $T_C$ is necessary or otherwise desirable, room temperature (RT) does not necessarily have to be obtained.

Referring now to FIGS. 4A through 4D, another example of shaping or setting the mandrel 12 is depicted. In this example, the mandrel 12 has a non-perforated shape memory polymer bladder 20 therein. FIG. 5 is a graph depicting a non-limiting example of how the temperature fluctuates during the method of FIGS. 4A through 4D, and then during curing (as shown between FIGS. 1B and 1C) and reverting the mandrel 12 to its permanent shape 12" (as shown between FIGS. 1C and 1D).

Figure 4A:
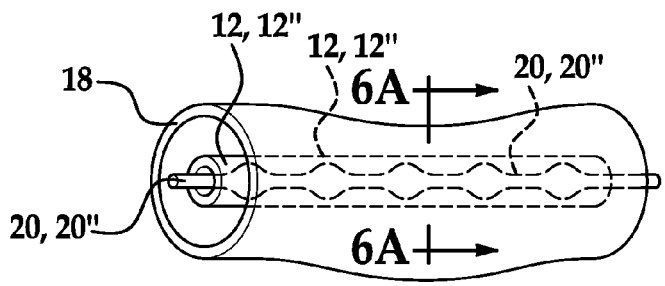

As shown in FIG. 4A, the mandrel 12 is in its permanent shrunken shape 12" when the non-perforated shape memory polymer bladder 20 is inserted therein. In this example, the permanent shape 20" of the shape memory polymer bladder 20 is the shrunken state, as shown in FIG. 4A. It is to be understood that the non-perforated shape memory polymer bladder 20 switching temperature $T_{SWB}$ is less than the switching temperature $T_{SWM}$ of the mandrel 12 (see FIG. 5). As such, while the shape memory polymer used for the bladder 20 and that used for the mandrel 12 may be of different chemistries, they may also be of a similar chemistry but have varying compositions. Therefore, both the bladder 20 and the mandrel 12 can be made of, for example, epoxy-, acrylate-, styrene-, or olefin-based systems or a combination thereof with varying compositions so as to target the appropriate switching temperature. For example, if acrylates are used for making both the bladder 20 and the mandrel 12, a cross-linking agent with a higher molecular weight may be used to reach lower switching temperature for the bladder 20 than for the mandrel 12.

The mandrel 12, 12" having the shape memory polymer bladder 20 therein is inserted into an external mold 18 having the predetermined preform shape, as shown in FIG. 4A. In this example, the external mold 18 has the same inner diameter dimension as that of the inner preform shape. This ensures that the mandrel 12 in its temporary shape 12' has an outer surface that is equal to the desirable inner surface of the preform 10.

It is to be understood that a parting section for the external mold 18 in this example may also be along a center axis (not shown) of the bladder 20/mandrel 12 assembly. As discussed hereinabove, this particular external mold 18 configuration enables facile removal of the mandrel 12 and bladder 20 after the temporary shape 12' of the mandrel 12 is set. It is to be understood that the external mold 18 may be configured in another suitable manner such that the mandrel 12, 12' is readily removable.

Figure 4B:
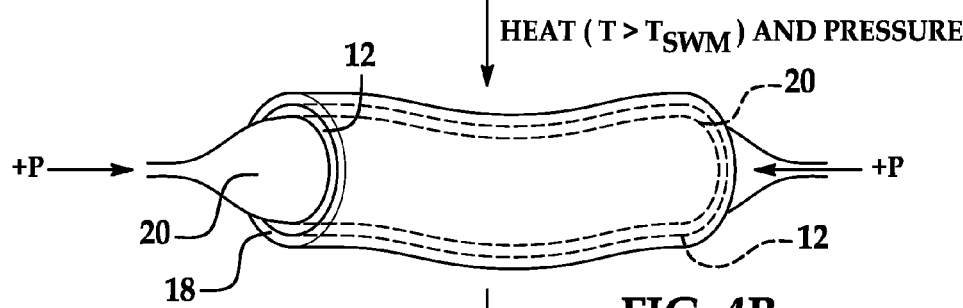

The mandrel 12 and shape memory polymer bladder 20 are then heated to a temperature that is above the switching temperature $T_{SWM}$ (shown in FIG. 5) of the mandrel 12. At this temperature, both the mandrel 12 and the shape memory polymer bladder 20 are in their low modulus state and are deformable. Pressure (+P) is applied to the inside of the shape memory polymer bladder 20 (as shown in FIG. 4B), thereby causing the bladder 20 to expand against the inner wall of the mandrel 12, and causing the deformable mandrel 12 to conform to its surroundings, i.e., the inner surface of the external mold 18. Such pressure may be air pressure or hydraulic pressure, applied with suitable pumps.

As the bladder 20 is pressed against the mandrel 12, and the mandrel 12 is pressed against the external mold 18, the temperature is then dropped to a temperature that is above the switching temperature $T_{SWB}$ of the bladder 20 and below the switching temperature $T_{SWM}$ of the mandrel 12 (see FIG. 5). The pressure is maintained during cooling. Cooling the mandrel 12 in this manner sets the temporary shape 12' of the mandrel 12 to the external mold 18 shape, and thus the desirable preform shape.

Figure 4C:
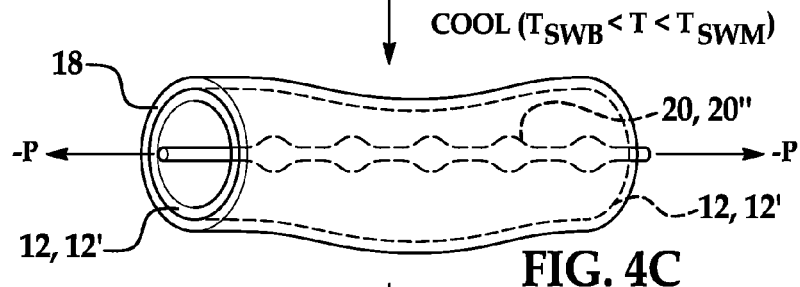

Furthermore, at this temperature (above $T_{SWB}$ and below $T_{SWM}$), the bladder 20 is still in its low modulus state and can be depressurized, as shown in FIG. 4C. The depressurization causes the bladder 20 to revert back to its permanent shrunken shape 20". Hence, the bladder 20 collapses within the mandrel 12, 12'. In the example shown in FIGS. 4A through 4D, a temporary shape of the bladder 20 is not set.

Once the bladder 20 is in its permanent shrunken shape 20", the temperature may again be lowered to below the switching temperature $T_{SWB}$ of the bladder 20, and in some instances, below the curing temperature $T_C$. This sets the bladder 20 in this shrunken state/shape 20".

Figure 4D:
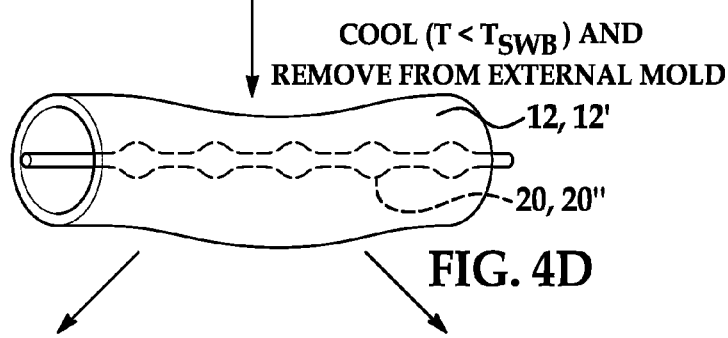

The mandrel 12 in its set temporary shape 12' may then be removed from the external mold 18, as shown in FIG. 4D. As previously mentioned, the external mold 18 may be configured to open in a desirable manner to enable removal of the mandrel 12, 12' therefrom.

FIGS. 4E and 4F illustrate two different examples of the method after the shape memory polymer bladder 20 is set in its shrunken shape 20". As shown in FIG. 4E, the shape memory polymer bladder 20, 20" may be removed from the mandrel 12, 12' prior to using the mandrel 12, 12' to form the preform 10 (e.g., via the method(s) discussed hereinabove in reference to FIGS. 1A through 1D). In another example, shown in FIG. 4F, the shape memory polymer bladder 20, 20" may remain in the mandrel 12, 12' during the formation of the preform 10 (e.g., via the method(s) discussed hereinabove in reference to FIGS. 1A through 1D).

As previously mentioned, FIG. 5 depicts example increases and decreases in temperature over the process of setting the mandrel 12 per the method of FIGS. 4A through 4D and then over the process of forming the preform 10 per the method of FIGS. 1A through 1D. As shown in the graph, the curing temperature $T_C$ of the binder (or other material 14) used to form the preform 10 is less than the switching temperatures $T_{SWM}$, $T_{SWB}$ of both the mandrel 12 and the bladder 20. As such, neither the mandrel 12 nor the bladder 20 deforms at this curing temperature $T_C$. After curing, the temperature may again be increased above the switching temperature $T_{SWM}$ of the mandrel 12, if it is desirable to recover the permanent shape 12" of the mandrel 12 and remove it from the preform 10.

Referring now to FIG. 6A, a cross section (taken along the 6A-6A line of FIG. 4A) of the mandrel 12 in its permanent shape 12" having the non-perforated shape memory polymer bladder 20 therein is depicted. When both the mandrel 12 and the bladder 20, in this example, are in their shrunken shapes 12", 20", the perforations 22 of the mandrel 12 remain unobstructed. In this non-limiting example, the perforations 22 are tapered such that the opening diameter of the perforation 22 is larger on the inner surface IS of the mandrel 12 than on the outer surface OS. As previously mentioned, other suitable geometries may be utilized for the perforations 22.

An enlarged view of the mandrel 12 and bladder 20 of FIG. 6A is shown in FIG. 6B. As depicted, the bladder 20 generally does not engage the mandrel 12. After the temperature is raised above at least the switching temperature $T_{SWB}$ of the bladder 20 and pressure is applied to the bladder 20, the bladder 20 deforms and is pressed against the inner surface IS of the mandrel 12, as shown in FIG. 6C. It is to be understood that, as previously described, the mandrel 12 will not be deformable until the temperature is raised above the switching temperature $T_{SWM}$ of the mandrel 12. Furthermore, it is believed that the conformation of the bladder 20 (when deformed and pressurized) to the perforations 22 of the mandrel 12 as the mandrel 12 is being set in its temporary predetermined preform shape 12' advantageously minimizes the formations of protuberances in the temporary shape 12', thereby minimizing protuberances in the final preform 10. When the mandrel 12/bladder 20 assembly is used in subsequent molding processes as a molding assembly/tool, bladder 20 conformation to the perforations 22 also minimizes the formation of protuberances in the final molded part.

Referring now to FIGS. 7A through 7E, still another example of shaping or setting the mandrel 12 is depicted. In this example, the mandrel 12 has another example of a non-perforated shape memory polymer bladder 24 therein, and an external mold 18 is not utilized. FIG. 8 is a graph depicting a non-limiting example of how the temperature fluctuates during the method of FIGS. 7A through 7E, and then during curing (as shown between FIGS. 1B and 1C) and reversion of the mandrel 12 to its permanent shape 12" (as shown between FIGS. 1C and 1D).

As shown in FIG. 7A, this example of the non-perforated shape memory polymer bladder 24 has the predetermined preform shape as its permanent shape 24". It is to be understood that the actual dimensions of the non-perforated shape memory polymer bladder 24 may be slightly smaller than the desired preform shape. This is due to the fact that, in this example, the mandrel 12 is set in its temporary shape 12' (the desirable preform shape) on the outer surface of the bladder 24 in its permanent shape 24". As such, in order to obtain the desirable preform 10 dimensions, the outer surface of the bladder 24 in its permanent shape 24" has the desirable inner surface preform 10 dimensions minus the thickness of the mandrel 12 in its temporary shape 12'.

The temporary shape 24' of the non-perforated shape memory polymer bladder 24 is a shrunken or collapsed shape. In this example, the switching temperature $T_{SWM}$ of the mandrel 12 is greater than the switching temperature $T_{SWB}$ of the bladder 24. As such, while the shape memory polymer used for the bladder 24 and that used for the mandrel 12 may be of different chemistries, they may also be of a similar chemistry but have varying compositions. Therefore, as mentioned above in reference to bladder 20 both the bladder 24 and the mandrel 12 can be made of, for example, epoxy-, acrylate-, styrene-, or olefin-based systems or a combination thereof with varying compositions so as to target the appropriate switching temperatures. For example, if acrylates are used for both the bladder 24 and the mandrel 12, a cross-linking agent with a higher molecular weight may be used to reach lower switching temperature for the bladder 24 than for the mandrel 12. However, it is to be understood that the shape memory polymer (or composition thereof) selected for the bladder 24 exhibits higher stiffness than the mandrel 12 above the switching temperature $T_{SWM}$ of the mandrel 12.

In order to obtain the temporary shape 24' (shown in FIG. 7B), the bladder 24 in its permanent shape 24" is exposed to a temperature that is greater than the switching temperature of the $T_{SWB}$ of the bladder 24. Under such temperature conditions, the bladder 24 becomes deformable and the application of pressure causes the bladder 24 to revert to its shrunken temporary shape 24'. Such pressure may be applied by drawing a vacuum from the inside of the bladder 24, or via mechanical deformation, such as tensile deformation along the axis A (See FIG. 2B), or radial deformation/compression, or via a combination thereof. The temporary shape 24' of the bladder 24 may then be set by cooling the bladder 24 to a temperature below its switching temperature $T_{SWB}$ (shown in FIGS. 7B and 8).

Once the bladder 24 is set in its temporary shrunken shape 24', the bladder 24, 24' is inserted into the mandrel 12 in its permanent shrunken shape 12", as shown in FIG. 7C.

Both the mandrel 12 and the bladder 24 are then heated to a temperature that is above the switching temperature $T_{SWM}$ (shown in FIG. 8) of the mandrel 12. At this temperature, both the mandrel 12 and the shape memory polymer bladder 24 are in their low modulus state and are deformable. Since the bladder 24 exhibits higher stiffness than the mandrel 12 at such a temperature, the bladder 24 recovers its permanent shape 24", or the predetermined shape of the preform 10. The recovery of the bladder permanent shape 24" forces the deformed mandrel 12 to expand and conform to the predetermined preform shape, as shown in FIG. 7D.

The bladder 24 in its permanent shape 24" and the mandrel 12 in its temporary shape 12' are then cooled to a temperature that is less than the switching temperature $T_{SWM}$ of the mandrel 12 and greater than the switching temperature $T_{SWB}$ of the bladder 24, thereby setting the mandrel 12 in its temporary shape 12'. At this temperature (above $T_{SWB}$ and below $T_{SWM}$), the bladder 24 is still in its low modulus state and can be deformed (or reverted back) to the shrunken shape 24', as shown in FIG. 7E. This may be accomplished by drawing a vacuum from inside of the bladder 24 or via mechanical deformation. The temperature is then again lowered to below the switching temperature $T_{SWB}$ of the bladder 24 (and in some instances, below the curing temperature $T_C$), thereby setting the temporary shape 24'.

In this example, it may be desirable to remove the bladder 24, 24' from the mandrel 12, 12' prior to forming the preform 10 (as shown in FIG. 7F) per the method(s) outlined in FIGS. 1A through 1D. If the bladder 24 remains in the mandrel 12, 12' during preforming (as shown in FIG. 7G), it may be undesirably reverted to its permanent shape 24" when the mandrel 12 is heated to above its switching temperature $T_{SWM}$, i.e., when it is desirable to shrink the mandrel 12 to its permanent shape 12" for removal from the preform 10 (as shown in FIG. 1D). However, the reversion of the bladder 24 to its permanent shape 24" may be prevented in such instance by allowing a vacuum and/or mechanical force to act upon the bladder 24 continuously throughout the process to maintain the bladder 24 in its temporary shape 24'.

As previously mentioned, FIG. 8 depicts example increases and decreases in temperature over the process of setting the mandrel 12 per the method of FIGS. 7A through 7E and then over the process of forming the preform 10 per the method of FIGS. 1A through 1D. As shown in the graph, the curing temperature $T_C$ of the binder (or other material 14) used to form the preform 10 is less than the switching temperatures $T_{SWM}$, $T_{SWB}$ of both the mandrel 12 and the bladder 24. As such, neither the mandrel 12 nor the bladder 24 deforms at this curing temperature $T_C$. After curing, the temperature may again be increased above the switching temperature $T_{SWM}$ of the mandrel 12, if it is desirable to recover the permanent shape 12" of the mandrel 12 and remove it from the preform 10.

It is to be understood that the preform 10 disclosed herein may subsequently used in any desirable molding process. It is to be further understood that in all of the examples disclosed herein, the decision as to whether to remove the bladder 16, 20, 24 before the preforming process may depend, at least in part, on whether the mandrel 12 will be used in subsequent molding processes, and, in some instances, on which state of the bladder 20, 24 is the predetermined preform shape.

While several embodiments have been described in detail, it will be apparent to those skilled in the art that the disclosed embodiments may be modified. Therefore, the foregoing description is to be considered exemplary rather than limiting.

The invention claimed is:

1. A method of making a preform, comprising:
   creating a pressure differential between an inside and an outside of a perforated shape memory polymer mandrel in its temporary shape such that pressure outside the perforated shape memory polymer mandrel is greater than pressure inside the perforated shape memory polymer mandrel, the perforated shape memory polymer mandrel having i) a predetermined preform shape as the temporary shape and ii) a shrunken shape as its permanent shape, wherein the shrunken shape is configured such that it is removable from the predetermined preform shape, wherein the predetermined preform shape is a tube shape, wherein creating the pressure differential is accomplished by drawing a vacuum from inside of the perforated shape memory polymer mandrel or by flowing fluid from outside of the perforated shape memory polymer mandrel through to inside of the perforated shape memory polymer mandrel;
   wherein prior to creating the pressure differential, the method further comprises:
      inserting a flexible bladder into the perforated shape memory polymer mandrel in its permanent shape;
      inserting the mandrel having the flexible bladder therein into an external mold having the predetermined preform shape;
      heating the mandrel and flexible bladder to a temperature above a switching temperature of the mandrel;
      pressurizing the flexible bladder, thereby forcing the mandrel against the external mold;
      cooling the mandrel to a temperature below its switching temperature, thereby setting the temporary shape of the mandrel which corresponds to the external mold shape;
      removing the external mold, thereby releasing the perforated shape memory polymer mandrel in its temporary shape; and
      depressurizing the flexible bladder;
   depositing at least one material onto a surface of the perforated shape memory polymer mandrel as the pressure differential is maintained to ensure that the at least one material is held in place on the surface of the perforated shape memory polymer material by the applied pressure differential alone;

setting the at least one material in the predetermined preform shape, thereby forming the preform; and maintaining the flexible bladder in the perforated shape memory polymer mandrel during creating, depositing and setting, and wherein creating the pressure differential further includes pulling an other vacuum on the flexible bladder such that pressure is the same both inside and outside of the bladder, and thus perforations of the perforated shape memory polymer mandrel are unobstructed by the flexible bladder.

2. The method as defined in claim 1, further comprising:
collapsing the perforated shape memory polymer mandrel to its permanent shape; and
removing the perforated shape memory polymer mandrel in its permanent shape from the preform.

3. The method as defined in claim 2, further comprising reshaping the perforated shape memory polymer mandrel to its temporary shape using a forming die.

4. The method as defined in claim 1 wherein setting is accomplished by curing at a temperature that is below a switching temperature of the perforated shape memory polymer mandrel.

5. The method as defined in claim 1 wherein the at least one material includes at least one filler and a binder material.

6. A method of making a preform, comprising:
creating a pressure differential between an inside and an outside of a perforated shape memory polymer mandrel in its temporary shape such that pressure outside the perforated shape memory polymer mandrel is greater than pressure inside the perforated shape memory polymer mandrel, the perforated shape memory polymer mandrel having i) a predetermined preform shape as the temporary shape and ii) a shrunken shape as its permanent shape, wherein the shrunken shape is configured such that it is removable from the predetermined preform shape;

depositing, as the pressure differential is maintained, at least one material onto a surface of the perforated shape memory polymer mandrel; and setting the at least one material in the predetermined preform shape, thereby forming the preform, wherein prior to creating the pressure differential, the method further comprises:
inserting the perforated shape memory polymer mandrel having a non-perforated shape memory polymer bladder therein into an external mold having the predetermined preform shape, wherein a switching temperature of the mandrel is greater than a switching temperature of the bladder;
heating the mandrel and the bladder to a temperature that is above the switching temperature of the mandrel;
pressurizing the bladder, thereby forcing the bladder and the mandrel against the external mold;
cooling the mandrel and the bladder to a temperature that is below the switching temperature of the mandrel and above the switching temperature of the bladder, thereby setting the temporary shape of the mandrel which corresponds to the external mold shape;
depressurizing the bladder at the temperature that is below the switching temperature of the mandrel and above the switching temperature of the bladder, thereby recovering a shrunken permanent shape of the bladder;
cooling the mandrel and the bladder to a temperature that is below the switching temperature of the bladder, thereby setting the permanent shape of the bladder; and
removing the external mold.

7. The method as defined in claim 6 wherein the mandrel includes perforations having a predetermined geometry.

8. A method of making a preform, comprising:
creating a pressure differential between an inside and an outside of a perforated shape memory polymer mandrel in its temporary shape such that pressure outside the perforated shape memory polymer mandrel is greater than pressure inside the perforated shape memory polymer mandrel, the perforated shape memory polymer mandrel having i) a predetermined preform shape as the temporary shape and ii) a shrunken shape as its permanent shape, wherein the shrunken shape is configured such that it is removable from the predetermined preform shape;

depositing, as the pressure differential is maintained, at least one material onto a surface of the perforated shape memory polymer mandrel; and setting the at least one material in the predetermined preform shape, thereby forming the preform, wherein prior to creating the pressure differential, the method further comprises:
inserting a non-perforated shape memory polymer bladder in its temporary shape into the perforated shape memory polymer mandrel in its permanent shape, wherein the non-perforated shape memory polymer bladder has i) the predetermined preform shape as its permanent shape and ii) a shrunken shape as its temporary shape, and wherein a switching temperature of the perforated shape memory polymer mandrel is greater than a switching temperature of the bladder;
heating the mandrel and the bladder to a temperature that is above the switching temperature of the mandrel;
deforming the bladder such that it recovers its permanent shape, thereby forcing the mandrel to conform to the predetermined preform shape;
cooling the mandrel and bladder to a temperature that is less than the switching temperature of the mandrel and greater than the switching temperature of the bladder, thereby setting the temporary shape of the mandrel as the predetermined preform shape;
deforming the bladder such that it recovers its temporary shape; and
cooling the mandrel and the bladder to a temperature that is less than the switching temperature of the bladder, thereby setting the temporary shape of the bladder.

9. A method of making a preform, comprising:
inserting a non-perforated shape memory polymer bladder into a perforated shape memory polymer mandrel, the perforated shape memory polymer mandrel having i) a predetermined preform shape as a temporary shape and ii) a shrunken shape as its permanent shape, wherein the shrunken shape is configured such that it is removable from the predetermined preform shape;
configuring the non-perforated shape memory polymer bladder such that it forces the perforated shape memory polymer mandrel into its temporary shape;
setting the temporary shape of the perforated shape memory polymer mandrel;
reconfiguring the non-perforated shape memory polymer such that it conforms to a shrunken shape;

creating a pressure differential between an inside and an outside of a perforated shape memory polymer mandrel in its temporary shape such that pressure outside the perforated shape memory polymer mandrel is greater than pressure inside the perforated shape memory polymer mandrel;

depositing, as the pressure differential is maintained, at least one material onto a surface of the perforated shape memory polymer mandrel; and setting the at least one material in the predetermined preform shape, thereby forming the preform.

10. A method of making a preform, comprising:

creating a pressure differential between an inside and an outside of a perforated shape memory polymer mandrel in its temporary shape such that pressure outside the perforated shape memory polymer mandrel is greater than pressure inside the perforated shape memory polymer mandrel, the perforated shape memory polymer mandrel having i) a predetermined preform shape as the temporary shape and ii) a shrunken shape as its permanent shape, wherein the shrunken shape is configured such that it is removable from the predetermined preform shape, wherein the predetermined preform shape is a tube shape, wherein creating the pressure differential is accomplished by drawing a vacuum from inside of the perforated shape memory polymer mandrel or by flowing fluid from outside of the perforated shape memory polymer mandrel through to inside of the perforated shape memory polymer mandrel;

wherein prior to creating the pressure differential, the method further comprises:

inserting a flexible bladder into the perforated shape memory polymer mandrel in its permanent shape;

inserting the mandrel having the flexible bladder therein into an external mold having the predetermined preform shape;

heating the mandrel and flexible bladder to a temperature above a switching temperature of the mandrel;

pressurizing the flexible bladder, thereby forcing the mandrel against the external mold;

cooling the mandrel to a temperature below its switching temperature, thereby setting the temporary shape of the mandrel which corresponds to the external mold shape;

removing the external mold, thereby releasing the perforated shape memory polymer mandrel in its temporary shape; and depressurizing the flexible bladder;

depositing at least one material onto a surface of the perforated shape memory polymer mandrel as the pressure differential is maintained to ensure that the at least one material is held in place on the surface of the perforated shape memory polymer material by the applied pressure differential alone;

setting the at least one material in the predetermined preform shape, thereby forming the preform; and mechanically maintaining the flexible bladder in tension along its axis in the perforated shape memory polymer mandrel during creating, depositing and setting such that when the pressure differential is created, perforations of the perforated shape memory polymer mandrel are unobstructed by the flexible bladder.

* * * * *